March 19, 1968 E. A. MEYER 3,373,539
TRIM FASTENER
Filed Aug. 18, 1965 3 Sheets-Sheet 1
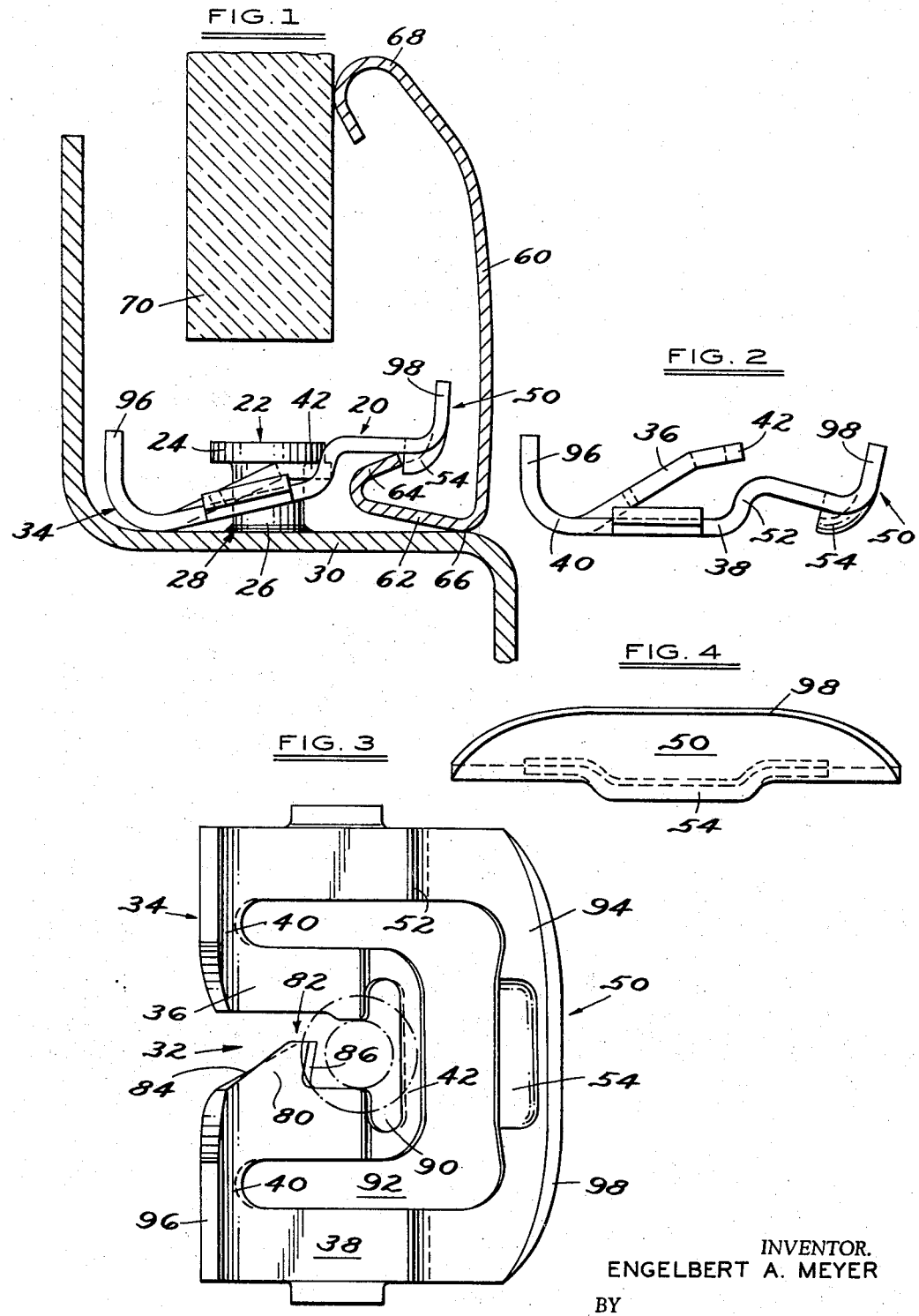
INVENTOR.
ENGELBERT A. MEYER
BY
Burton & Parker
ATTORNEYS March 19, 1968 E. A. MEYER 3,373,539
TRIM FASTENER Filed Aug. 18, 1965 3 Sheets-Sheet 2

INVENTOR.
ENGELBERT A. MEYER
BY
Burton & Parker
ATTORNEYS

March 19, 1968 E. A. MEYER 3,373,539
TRIM FASTENER
Filed Aug. 18, 1965 3 Sheets-Sheet 3
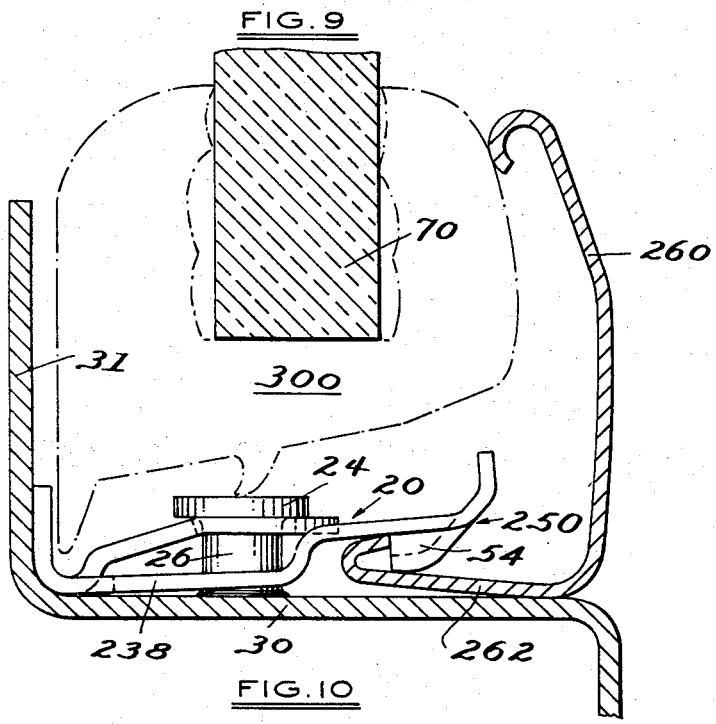
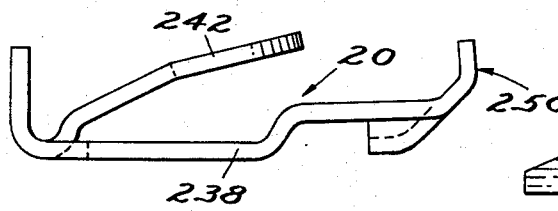
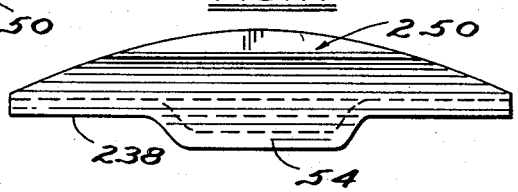
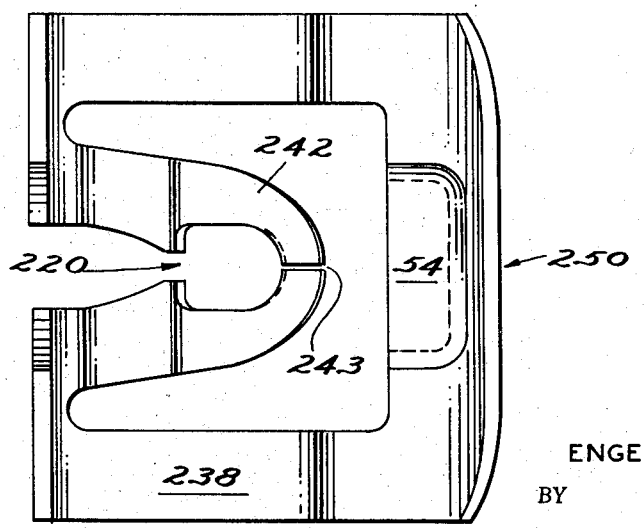
INVENTOR.
ENGELBERT A. MEYER
BY
*Burton & Parker*
ATTORNEYS

United States Patent Office 3,373,539
Patented Mar. 19, 1968

3,373,539
TRIM FASTENER
Engelbert A. Meyer, Union Lake, Mich., assignor to Warren Fastener Corporation, a corporation of Michigan
Filed Aug. 18, 1965, Ser. No. 480,595
10 Claims. (Cl. 52—718)

ABSTRACT OF THE DISCLOSURE

This disclosure relates to a clip adapted to attach a structural member, such as an automotive molding, to the surface of a support. The clip includes a body portion having a U-shaped opening, a ramp portion resiliently joined to the body portion within the U-shaped opening having a slot extending through one edge to receive a button secured to the support. The slot has a restricted opening causing the ramp portion to flex laterally to receive the button and lock the button in place.

Field of the invention

This invention relates to an improved clip fastener and to a molding assembly. More particularly, this invention relates to a clip fastener adapted to tension the lateral edge of a channel against a support, and a molding assembly having a clip means which serves to interconnect one lateral edge of a molding member with a button extending from the button support. This invention is particularly, although not exclusively adapted to tensioning a channel or molding member, at its opposed lateral edges, against a support and a planar surface, such as an automotive window, substantially perpendicular to the support.

Molding members are used in the manufacture of automobiles, refrigerators and the like to meet functional and design requirements.

Preferably the button is attached to the support in accordance with the invention shown in the Sweeney Patent 3,153,468, wherein the button is welded to steel or adhesively secured to various materials including steel, thereby eliminating the corrosion problem inherent in previously used techniques requiring a hole through the support.

A suitable size of button, presently used in automobile manufacture, involves a button which is 0.200 inch in diameter at its head and 0.160 inch in height, the shank of the button being less than one-half the diameter of the head. Utilization of this new concept of trim attachment in the automobile field provides substantial economies and advantages over previous methods. Similar economies and advantages are obtainable in other fields, such as home appliances, refrigerators, stoves and the like.

The instant invention will be described in the context of an automobile molding assembly.

Summary of the invention

The clip means of my invention is adapted to retain a structural member to a support having a button extending from the surface of the support. The clip means has a body portion defining a U-shaped opening, and a ramp portion extending from the body portion at an acute angle, and resiliently joined to the body portion within the U-shaped opening. The ramp portion has a slot opening through one edge for receiving the shank of the button, and a button seat adjacent the end of the ramp communicating with the slot. The slot is restricted adjacent the opening to the button seat to cause the ramp portion to resiliently flex from the axis of the slot as the shank of the button is received therethrough. This relationship securely retains a button received on the button seat, and cannot be removed simply by biasing the ramp portion toward the surface of the support.

In the disclosed embodiment of my invention, the slot extends through the edge of the body portion to permit lateral flexing of the body portion with the ramp portion as the shank of the button is received through the restricted opening. The slot portion may be displaced laterally from the axis of the slot by an inwardly projecting tang extending from a wall of the ramp portion defining the slot, with the tang defining a lip facing the button seat to prevent withdrawal of the button in the axis of the slot. The lip portion may be tapered toward the axis of the slot to cause the clip portion to more securely retain the button when the button is biased toward the opening in the slot. According to another embodiment of the clip means of my invention, the restricted opening includes a pair of opposed tangs which extend inwardly from the opposed walls of the ramp, adjacent the button seat, to prevent removal of the button through the slot. The body portion of the clip of my invention may be provided with a tang, opposite to the end of the ramp portion, adapted to retain the edge of the structural member therebeneath. In the preferred embodiment, the tang extends from the body portion within the U-shaped opening. The ramp portion may be struck from the body portion to provide a one-piece clip assembly, and a generally U-shaped cutout portion may be defined between the ramp and the body portion to aid in the lateral flexing of the ramp portion.

On the assembly line the clip is connected to a button, previously secured to an automotive panel, by forcing the clip toward the button. A suitable tool may be used, if desired, for this purpose. The clip is provided with a button receiving slot extending through one edge, and a resiliently joined inclined ramp portion which terminates in a button seat for bearing engagement with the underside of the button head. In the secured position the clip is tensioned against the underside of the button head, and various means may be provided which restrain the clip against withdrawal from the button.

The edge of the clip, opposite the slot opening, is spaced from the plane of the body portion to receive a lateral flange of a channel or molding member therebeneath, and a lock tang is provided to restrain the channel against withdrawal from the clip. The flange of the channel is secured in the assembly operation by forcing the channel edge, against the resilient tension of the ramp portion, under the edge of the clip member where it snaps in place.

The clip and assembly of this invention has been found especially suitable in securing the protective trim adjacent automotive windshields and windows, where the opposite edge of the trim piece channel bears against the window, or a sealing gasket fitted about the edge of the window, which is substantially perpendicular to the panel or button support.

The above described assembly provides a seal about automotive windshields and windows which is not sensitive to corrosion, and which cannot leak at the stud connection because the panel is not perforated as required by previous assemblies.

Other objects, advantages, and meritorious features will more fully appear from the following specification, claims, and accompanying drawings, wherein:

FIG. 1 is a side elevation of one embodiment of my invention with the extending end of the channel member tensioned against a glass panel such as an automotive window;

FIG. 2 is a side elevation of the clip embodiment shown in FIG. 1;

FIG. 3 is a top elevation of the clip embodiment shown in FIG. 2;

FIG. 4 is an end view of the clip embodiment shown in FIGS. 2 and 3;

FIG. 9 is a side elevation of another embodiment of my invention with the extending end of the channel member tensioned against a gasket received about the edge of a glass panel, such as an automotive window;

FIG. 10 is a side elevation of the clip embodiment shown in FIG. 9;

FIG. 11 is an end view of the clip embodiment shown in FIG. 10;

FIG. 12 is a top elevation of the clip embodiment shown in FIGS. 10 and 11.

Figure 5:
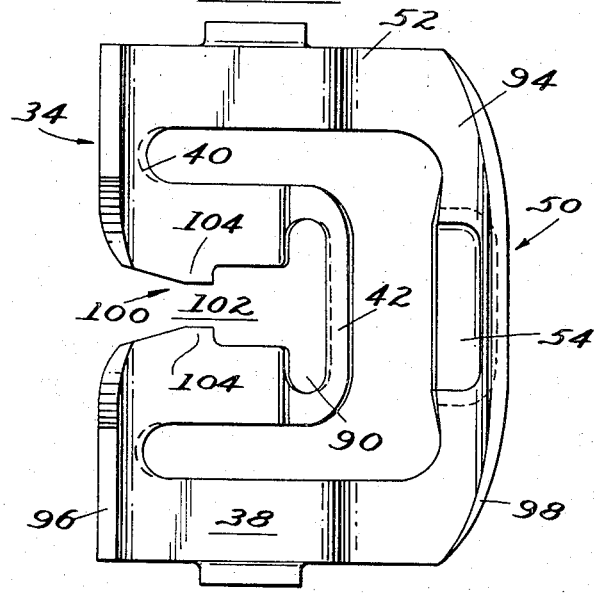
FIG. 5 is a top elevation of another embodiment of the clip of my invention.

In FIGS. 1 to 4, I show an embodiment of the molding assembly of this invention, and the embodiment of the clip shown in this assembly. The clip, generally referred to as 20 in FIG. 1, is connected near its mid portion to a button 22. The button has a shank portion 26 welded to the panel or support 30 at 28, and a head portion 24.

The clip 20 has a button shank receiving slot 32 which extends through one edge 34 of the clip. An inclined ramp portion or tongue 36 is struck from the body portion 38 of the clip, and is resiliently joined to the body portion at 40 on opposite sides of the slot. The ramp portion terminates in a seat 42, for bearing engagement against the underside of the button head 24, which tensions the clip 20 toward the support 30.

The rearward portion or opposed edge 50 of the clip is spaced from the plane of the body portion 38 by an inclined bend in the body portion 52, and a tang or lip 54 is struck from the rearward portion of the clip to present a downwardly extending locking means to restrain a channel member or molding 60 which is disposed beneath the edge.

In the molding assembly shown in FIG. 1 and the subsequent figures, the clip 20 functions as a lever in cooperation with the button 22. One edge 34 of the clip is tensioned by the resiliently joined inclined ramp 36, which bears against the underside of the button head 24, against the support 30, and the opposed edge is tensioned against the laterally extending flange 62 of the channel member. This tensions the channel against the support 30 at 66, to provide a moment about the axis 66, which tensions the opposed extending end 68 of the channel against a planar member 70, which could be an automotive window.

The channel of this embodiment is provided with an inwardly extending lip 64 which engages the tang 54 provided on the clip to restrain the channel against withdrawal. The inclined bend 52 of the body portion provides a resiliency about the bend to the edge 50, which aids in the flexing required for receiving the channel flange beneath the opposed edge.

The slot 32 of this embodiment has been restricted to inhibit the removal of the clip from the stud 22, and the structure of the clip has been designed to provide a resiliency which allows the shank 26 of the button to pass through the restricted portion of the slot. One wall of the slot is provided with a tapered tang 80 which extends toward and through the axis of the slot to provide a restricted passage 82. The width of the restricted passage 82 is less than the diameter of the button shank 26.

The tang is tapered at 84 toward the axis of the slot so that the slot is forced open as the shank of the button is forced into the slot. The opposite lip 86 of the tang is slightly tapered toward the button seat 42. The lip 86 blocks the withdrawal of the button in the axis of the slot, and the button shank must be forced beyond the extent of this lip to withdraw the button from the button seat.

The resiliency of the clip which allows the shank of the button to pass through the restricted area of the slot is provided by a combination of features. The button seat is provided with a transverse slot 90 which cooperates with the thin button seat 42 to allow the ramp portion 46 to flex outwardly. The U-shaped slot 92 allows the body portion to flex inwardly about the reduced sections 40 and 94. Thus, as the button shank is forced toward the reduced area 82 of the slot the walls of the slot spread to admit the button shank. The thin resilient button seat 42 also tends to flex to close the slot 32, as the button shank is driven against the seat during installation of the clip.

The opposed edges 34 and 50 of the clip, are provided with upturned flanges, 96 and 98 respectively, which makes the clip structure more rigid in the plane of the body portion. The flange 96 also provides a radial bearing surface for contact with the support 30.

Figure 6:
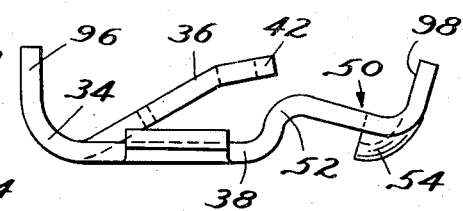
FIG. 6 is a side elevation of the clip embodiment shown in FIG. 5.

The embodiment of the clip illustrated in FIGS. 5 and 6 is nearly identical to the embodiment shown in FIGS. 2 to 4, except that the slot is symmetrical about its axis. The restricted portion 102 of the slot is defined by two smaller tang portions 104, which do not extend beyond the axis of the slot. This clip may therefore be more easily removed from the shank of the button, which is less satisfactory in some applications.

Figure 7:
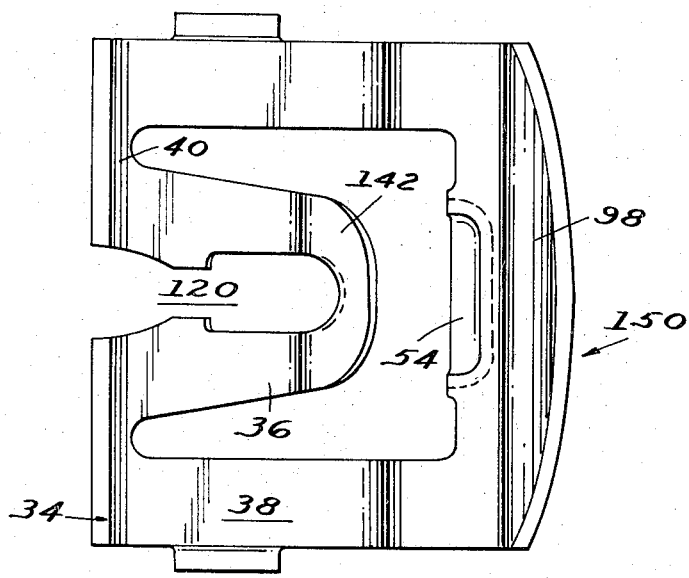
FIG. 7 is a top elevation of another embodiment of the clip of my invention.
Figure 8:
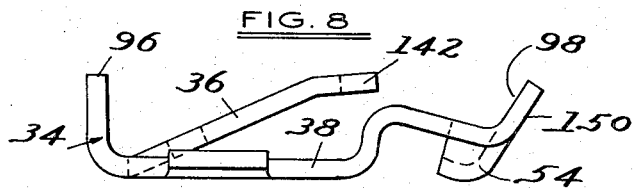
FIG. 8 is a side elevation of the clip embodiment shown in FIG. 7.

The embodiment of my invention shown in FIGS. 7 and 8 is similar to the clip embodiments previously described, however, the restricted area of the slot 120 is wider than shown in previous embodiments. This reduces the need for the flexing of the walls of the slot. The button seat 142 does not have a transverse slot, as shown at 90 in FIGS. 2 to 6, and the width of the rearward edge 150 is greater than shown in the previous structures.

The clip embodiment shown in FIGS. 9 to 12 is similar to the embodiment shown in FIGS. 7 and 8, except that the button seat is split at 243 to provide the resiliency required to spread the slot walls to admit the button shank. The restricted portion of the slot may therefore be narrower than shown in FIG. 7. It is possible, in the embodiment shown in FIGS. 10 to 12, to force the button shank 26 through the split 243, which may be a disadvantage in some applications. However, the clip of this embodiment is designed to seat against an opposed wall 31 of the support, which prevents this from happening.

The channel 260, shown secured to this embodiment of my clip, has a longer flange portion 262 because the channel is designed to bear against a gasket 300, disposed about the lower edge of the glass panel 70. The opposed edge of the clip 250 lies in a plane closer to the plane of the body portion 238, than shown in the previous embodiments. This was required to accommodate the space taken up by the gasket 300.

The details of the different embodiments of my invention which are similar to the details described in reference to the embodiment shown in FIGS. 1 through 4 have been omitted to prevent repetition. The function and operation of the embodiments, however, are the same as described in reference to FIGS. 1 through 4.

It is understood that an object of this invention is to provide a very simple structured clip and molding assembly, which can be inexpensively manufactured, and easily installed. The embodiments illustrated are therefore struck and formed from a unitary blank, which may be accomplished by a single machine. However, various modifications may be made which are within the purview of the appended claims. For example, the resiliently joined ramp portion may be a separate element joined to the body portion, or other modifications of the button shank receiving slot may be provided which inhibits the removal of the clip from the button shank.

I claim:

1. A clip means for retaining a structural member to a support having a button extending therefrom, comprising: a body portion having a U-shaped cut-out, a ramp portion extending at an acute angle from said body portion resiliently joined to said body portion opposite the bite of the U-shaped cut-out and positioned within the cut-out opening, said ramp portion having a slot opening through one edge and through said body portion for receiving the shank of the button and a button seat on said ramp adjacent the end of the ramp communicating with said slot, said slot restricted adjacent the opening to said button seat to cause said ramp portion to resiliently flex from the axis of the slot as the shank of the button is received therethrough securely retaining a button received on said button seat, means on said body portion opposite said ramp adapted to restrain a structural member therebeneath.

2. The clip means defined in claim 1, characterized in that the restriction of the slot includes a pair of opposed tangs which extend inwardly from the opposed walls of the ramp adjacent said button seat.

3. The clip means defined in claim 1, characterized in that the walls of said body portion opposite the end of said ramp portion has a tang extending opposite to said ramp portion to retain the edge of the structural member therebeneath.

4. The clip means defined in claim 3, characterized in that said tang extends from said body portion within said U-shaped opening.

5. The clip means defined in claim 1, characterized in that said ramp portion is struck from said body portion and said body portion has a generally U-shaped cut-out portion defined between said ramp and said body portion to aid in the lateral flexing of said ramp portion.

6. The clip means defined in claim 1, wherein: said button seat is split generally along the axis of the slot to allow the clip ramp portion to resiliently flex to receive the shank portion of the button through the restricted portion of the slot.

7. The clip means defined in claim 1, wherein: the restricted portion of the button receiving slot is displaced laterally from the axis of the slot by an inwardly projecting tang extending from a wall of the ramp portion defining the slot, said tang defining a lip facing a button received in the button seat to prevent the withdrawal of the button in the axis of the slot.

8. The clip means defined in claim 7, wherein: said lip is tapered toward a button received in the button seat.

9. The clip means defined in claim 7, wherein: the face of the tang facing the opening through said one edge is tapered toward the axis of the slot.

10. A clip for use in securing one lateral edge of a molding strip having an inturned generally U-shaped laterally extending flange to a support which has a button secured thereto having a shank portion and an overhanging seat portion generally parallel to and spaced from the support, comprising: a body portion having a tongue portion struck therefrom, said tongue portion resiliently joined to said body portion and defining an acute angle with said body portion and having a button shank receiving slot extending through one edge of said body portion terminating in a button seat for bearing against the underside of the button head, said body portion having a U-shaped cut-out defined about said tongue portion to permit said tongue portion to flex laterally and receive a button through said slot, said body portion having a rearward edge spaced from the plane of the body portion having a downwardly extending locking tang to restrain a molding strip received therebeneath from withdrawal.

References Cited
UNITED STATES PATENTS

| | | | |
|---|---|---|---|
| 2,268,269 | 12/1941 | Toney et al. | 24—73 |
| 2,358,837 | 9/1944 | Tinnerman | 85—36 |
| 2,364,880 | 12/1944 | Tinnerman | 85—36 |
| 2,367,109 | 1/1945 | Fay | 85—36 |
| 2,709,390 | 5/1955 | Smith | 287—189.35 |
| 3,239,988 | 3/1966 | Meyer | 52—718 |
| 3,241,277 | 3/1966 | Coppock | 52—208 |
| 3,274,740 | 9/1966 | Hall | 52—208 |

FOREIGN PATENTS

| | | |
|---|---|---|
| 209,207 | 7/1957 | Australia. |

FRANCIS K. ZUGEL, *Primary Examiner.*